(12) United States Patent
Hong et al.

(10) Patent No.: US 11,420,258 B2
(45) Date of Patent: Aug. 23, 2022

(54) METHOD FOR MANUFACTURE OF TRANSITION METAL OXIDE FINE PARTICLES

(71) Applicant: LG Electronics Inc., Seoul (KR)

(72) Inventors: Sanghyun Hong, Seoul (KR); Jihyun Kim, Seoul (KR); Seojin Lee, Seoul (KR); Sangeun Shim, Seoul (KR); Jiyoung Jung, Seoul (KR); Sosan Hwang, Seoul (KR); Yooseok Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 6 days.

(21) Appl. No.: 17/050,270

(22) PCT Filed: May 10, 2019

(86) PCT No.: PCT/KR2019/005674
§ 371 (c)(1),
(2) Date: Oct. 23, 2020

(87) PCT Pub. No.: WO2019/216719
PCT Pub. Date: Nov. 14, 2019

(65) Prior Publication Data
US 2021/0229179 A1     Jul. 29, 2021

(30) Foreign Application Priority Data

May 11, 2018   (KR) .................. 10-2018-0054444
May 10, 2019   (KR) .................. 10-2019-0055021

(51) Int. Cl.
| | | |
|---|---|---|
| B22F 9/00 | (2006.01) |
| B22F 9/24 | (2006.01) |
| C01G 39/02 | (2006.01) |
| C01G 41/02 | (2006.01) |
| B22F 1/054 | (2022.01) |
| B22F 1/142 | (2022.01) |

(52) U.S. Cl.
CPC ............. B22F 9/24 (2013.01); B22F 1/054 (2022.01); B22F 1/142 (2022.01); C01G 39/02 (2013.01); C01G 41/02 (2013.01); B22F 2202/03 (2013.01); B22F 2302/25 (2013.01); B22F 2304/058 (2013.01)

(58) Field of Classification Search
CPC ........ C01G 39/02; C01G 41/02; C01B 13/36; C01B 13/145; C01P 2004/60–64
See application file for complete search history.

(56) References Cited

U.S. PATENT DOCUMENTS

| | | | | |
|---|---|---|---|---|
| 4,859,431 A | * | 8/1989 | Ehrhardt ............ | A61K 51/1282 250/432 PD |
| 2007/0224096 A1 | * | 9/2007 | Albrecht .............. | C01G 41/00 423/53 |

FOREIGN PATENT DOCUMENTS

| | | |
|---|---|---|
| CN | 106430312 A | 2/2017 |
| JP | S61209918 A | 9/1986 |
| JP | H01501423 A | 5/1989 |
| JP | H02172824 A | 7/1990 |
| JP | H02312106 A | 12/1990 |
| JP | 2007229561 A | 9/2007 |
| JP | 2011184282 A | 9/2011 |
| JP | 2012206867 A | 10/2012 |
| JP | 5966093 B1 | 8/2016 |
| JP | 2017124961 A | 7/2017 |
| KR | 20040082246 A | 9/2004 |
| KR | 20160101297 A | 8/2016 |
| KR | 20160125184 A | 10/2016 |

OTHER PUBLICATIONS

Japanese Office Action issued in Japanese Patent Application No. 2020-562729 dated Jan. 11, 2022, with English Translation.

* cited by examiner

*Primary Examiner* — Steven J Bos
(74) *Attorney, Agent, or Firm* — Dentons US LLP

(57) ABSTRACT

The present invention provides a method for the manufacture of transition metal oxide fine particles, the method comprising the steps of: heating a strong-alkaline aqueous solution while stirring same; adding to and dissolving in the heated strong-alkaline aqueous solution a transition metal oxide; adding a strong-acid aqueous solution to the strong alkaline aqueous solution in which the transition metal oxide is dissolved, while stirring same, thereby re-dissolving a solid generated at the interface between the strong-alkaline aqueous solution and the strong-acid aqueous solution; adjusting the pH of the mixed aqueous solution resulting from mixing the strong-alkaline aqueous solution and the strong acid aqueous solution, through adjustment of the adding rate and amount of the strong-acid aqueous solution, to precipitate transition metal oxide fine particles; and separating the transition metal oxide fine particles from the mixed aqueous solution and sequentially washing, drying, and thermally treating the separated transition metal oxide fine particles.

19 Claims, 11 Drawing Sheets

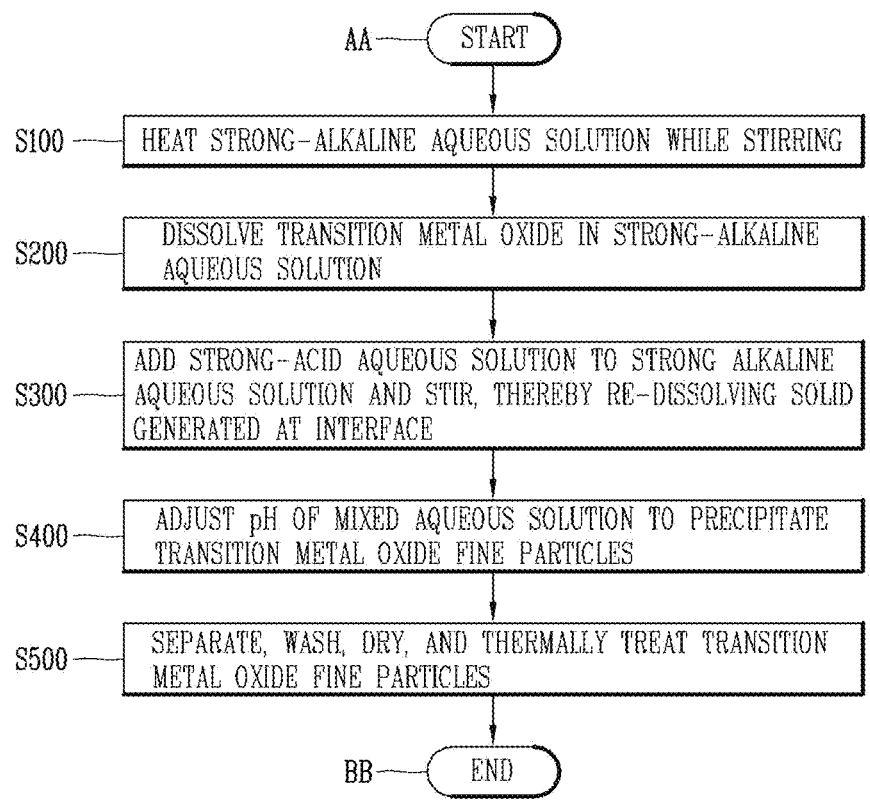
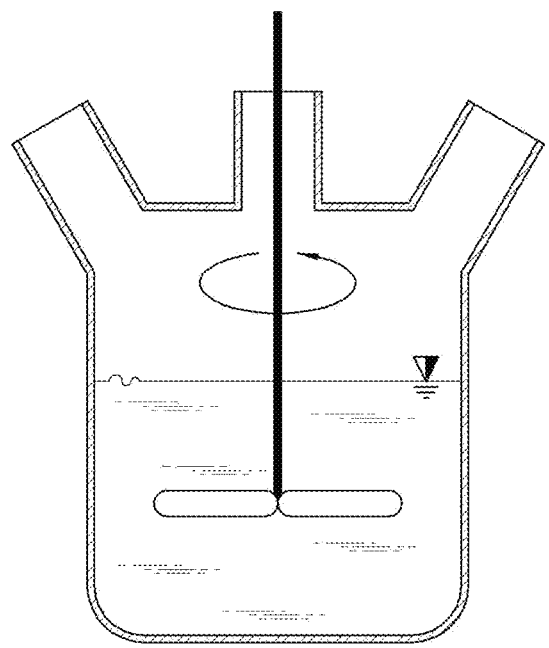

NaOH (aq) + MoO₃ (aq) + MoO₃ (s)

NaOH (aq) + MoO₃ (aq) + 70% HNO₃ (aq)

NaNO3 (aq) + MoO3 (s)

METHOD FOR MANUFACTURE OF TRANSITION METAL OXIDE FINE PARTICLES

CROSS-REFERENCE TO RELATED APPLICATIONS

This application is the National Stage filing under 35 U.S.C. 371 of International Application No. PCT/KR2019/005674, filed on May 10, 2019, which claims the benefit of earlier filing date and right of priority to Korean Application No. 10-2018-0054444, filed on May 11, 2018, and Korean Application No. 10-2019-0055021, filed on May 10, 2019, the contents of which are all hereby incorporated by reference herein in their entirety.

TECHNICAL FIELD

The present disclosure relates to a method for the manufacture of transition metal oxide fine particles having a size smaller than several micrometers (μm), more preferably a size of several hundred nanometers (nm).

BACKGROUND

Antibacterial and catalytic properties can be imparted to a base material by applying transition metal oxide coating to the base material. As a surface of the base material quickly becomes acidic when transition metal oxides come in contact with moisture in the atmosphere, the base material can have the antibacterial property that inhibits the growth of bacteria or kill bacteria. In addition, transition metal oxides have the catalytic property that converts odor compounds into odorless compounds by adsorbing and oxidizing some malodorous substances.

In order for a base material to which antibacterial and catalytic properties are imparted using transition metal oxides to maintain its material properties of a polymer, the transition metal oxides should be in the form of particles with a relatively large surface area. Porous microparticles with a size of several micrometers to nanoparticles with a size of several hundred nanometers may be examples of this.

A physical grinding method such as milling may be used for manufacturing transition metal oxide fine particles. However, it is very difficult to adjust the particle size of transition metal oxides to a size of several micrometers to several hundred nanometers by using the physical grinding method.

Korean Laid-Open Application No. 10-2004-0082246 (published on Sep. 24, 2004 and hereinafter, referred to as "Patent Document"), which is hereby incorporated by reference, discloses a method of producing multicomponent metal oxide fine particles for antibacterial and deodorization by using coprecipitation and impregnation. However, in the Patent Document, fine particles are produced by using a ball mill, thereby having limitations of the physical grinding method. Further, no specific method for controlling the size of the particulates was not also presented.

SUMMARY

The present disclosure describes a method for the manufacture of transition metal oxide fine particles with a size smaller than several micrometers, more preferably, a size smaller than a micrometer (μm) so as to have a relatively large surface area, thereby allowing material properties of a base material to be maintained when the transition metal oxide fine particles are coated on the base material.

The present disclosure also describes a method for the manufacture of an additive capable of maintaining dispersion stability even when a thickness of a layer coated on a base material is very thin, ranging from several hundred nanometers to several micrometers, and a method for the manufacture of transition metal oxide fine particles contained in the additive.

The present disclosure also describes a method for the manufacture of transition metal oxide fine particles capable of producing transition metal oxide fine particles of a desired size by controlling reaction conditions. More particularly, the present disclosure is directed to providing a step for producing a strong base or alkaline aqueous solution, which is advantageous for atomization of transition metal oxides, and precipitation conditions for the transition metal oxides.

The present disclosure also describes a method for the manufacture of transition metal oxide fine particles capable of preventing formation of by-products during the process of producing the metal oxide fine particles.

The present disclosure also describes a method for the manufacture of transition metal oxide fine particles capable of addressing difficulty in redispersion due to strong secondary bonding.

The present disclosure also describes a method for the manufacture of transition metal oxide fine particles capable of maintaining stability even in contact with moisture.

The embodiments disclosed herein provide a method for the manufacture of transition metal oxide fine particles that may include dissolving a transition metal oxide in a strong alkaline aqueous solution and titrating it with a strong acid aqueous solution to precipitate the transition metal oxide fine particles.

The embodiments disclosed herein also provide a method for the manufacture of transition metal oxide fine particles that may include the steps of: heating a strong alkaline aqueous solution while stirring; adding a transition metal oxide in the heated strong alkaline aqueous solution to dissolve the transition metal oxide in the strong alkaline aqueous solution; adding a strong acid aqueous solution to the strong alkaline aqueous solution in which the transition metal oxide is dissolved while stirring to re-dissolve a solid material formed at an interface between the strong alkaline aqueous solution and the strong acid aqueous solution; adjusting a pH of a mixed aqueous solution of the strong alkaline aqueous solution and the strong acid aqueous solution by controlling speed and amount of adding the strong acid aqueous solution to precipitate transition metal oxide fine particles; and separating the transition metal oxide fine particles from the mixed aqueous solution and sequentially washing, drying, and heat treating the separated transition metal oxide fine particles.

Water and sodium hydroxide (NaOH) may be mixed in a mass ratio of 6:1 to 10:1, then heated while stirring to produce the strong alkaline aqueous solution.

The purity of the sodium hydroxide may be greater than or equal to 99%.

The heating of the strong alkaline aqueous solution while stirring may be performed to heat the strong alkaline aqueous solution at 60 to 105° C. while stirring at 600 rpm to 700 rpm.

The transition metal oxide may include at least one selected from a group composed of molybdenum trioxide and tungsten trioxide.

The dissolving of the transition metal oxide in the strong alkaline aqueous solution may be performed to sequentially dissolve molybdenum trioxide and tungsten trioxide in the strong alkaline aqueous solution.

A temperature for dissolving the tungsten trioxide in the strong alkaline aqueous solution may be lower than a temperature for dissolving the molybdenum trioxide in the strong alkaline aqueous solution.

The purity of the molybdenum trioxide may be greater than or equal to 99.5%, and the purity of the tungsten trioxide may be greater than or equal to 99%.

The dissolving of the transition metal oxide in the strong alkaline aqueous solution may be performed until the transition metal oxide is saturated.

The dissolving of the transition metal oxide in the strong alkaline aqueous solution may be performed to heat the transition metal oxide while stirring until all of suspended solids are dissolved in the strong alkaline aqueous solution.

The dissolving of the transition metal oxide in the strong alkaline aqueous solution may be performed to heat the strong alkaline aqueous solution while stirring until the strong alkaline aqueous solution becomes transparent.

The dissolving of the transition metal oxide in the strong alkaline aqueous solution may be performed under the same stirring and heating temperature conditions as the heating of the strong alkaline aqueous solution while stirring.

The strong acid aqueous solution may be composed of 60% to 75% nitric acid.

The re-dissolving of the solid material may include: adding the strong acid aqueous solution; stopping the addition of the strong acid aqueous solution when the solid material is formed; stirring until the solid material is re-dissolved in the mixed aqueous solution of the strong alkaline aqueous solution and the strong acid aqueous solution; and adding the strong acid aqueous solution again when the solid material is re-dissolved in the mixed aqueous solution.

The precipitating of the transition metal oxide fine particles may be performed to generate the transition metal oxide fine particles by adjusting the pH of the mixed aqueous solution to weakly basic.

The precipitating of the transition metal oxide fine particles may be performed to generate the transition metal oxide fine particles by reducing the pH of the mixed aqueous solution to 7.9 to 8.1.

The separating of the transition metal oxide fine particles from the mixed aqueous solution may be performed to filter the transition metal oxide fine particles using a membrane filter, and the washing of the separated transition metal oxide fine particles may be performed by using distilled water of 100 g or less.

The washing of the separated transition metal oxide fine particles may be performed such that the transition metal oxide fine particles washed with the distilled water are additionally washed with an aqueous solution of ethanol.

The drying of the transition metal oxide fine particles may be performed to freeze dry the transition metal oxide fine particles.

The drying of the transition metal oxide fine particles may include primary drying that involves drying the transition metal oxide fine particles at a room temperature for at least 24 hours, and second drying that involves drying the primarily dried transition metal oxide fine particles in a vacuum while increasing a temperature above the room temperature.

The heat treating of the transition metal oxide fine particles may be performed such that the transition metal oxide fine particles separated from the mixed aqueous solution are dried and heat treated at a temperature of 380° C. to 450° C. for at least 30 minutes.

According to the present disclosure, transition metal oxide fine particles having a size of several micrometers, more preferably, a smaller size of several tens to hundred nanometers. In particular, in order to suppress formation of by-products during the process of producing the transition metal oxide fine particles, the present disclosure includes processes of stirring and heating a strong alkaline aqueous solution, and of dissolving suspended solids (or solid remaining) and by-products generated during the process of producing the transition metal oxide fine particles, allowing pure transition metal oxide fine particles to be produced.

According to the present disclosure, the strong alkaline aqueous solution suitable for the formation of the transition metal oxide fine particles may be produced by setting conditions such as a mass ratio of water to sodium hydroxide, an agitation (stirring) speed, and a temperature for heating.

According to the present disclosure, an environment suitable for atomization of the transition metal oxides may be provided by setting conditions, such as the order of adding molybdenum trioxide and tungsten trioxide to the strong alkaline aqueous solution, an agitation (stirring) speed, and a temperature for heating.

According to the present disclosure, transition metal oxide fine particles of a desired or intended size may be produced by providing conditions for washing, drying, heat treating (or heat treatment), and the like that prevent insufficient crystallization of the transition metal oxide fine particles, or aggregation of the transition metal oxide fine particles.

The transition metal oxide fine particles produced according to the present disclosure may be used as a material of a coating solution to form a coating layer so as to impart antibacterial and catalytic properties to a base material. In addition, as the transition metal oxide fine particles have a large surface area, material properties of the base material may be maintained.

In particular, the transition metal oxide fine particles produced according to the present disclosure may form a stable composition of a thin film coating layer with a thickness of several hundred nanometers.

Redispersion of fine particles of a solvent constituting the coating solution may be difficult due to strong secondary bonding between the fine particles. However, in the present disclosure, the transition metal oxide fine particles are freeze dried, allowing porous fine particles to be formed, and the difficulty in redispersion to be solved.

According to the present disclosure, as the transition metal oxide fine particles are converted to a stable alpha phase through heat treatment, dispersion stability may be maintained even in contact with moisture.

BRIEF DESCRIPTION OF THE DRAWINGS

FIG. 1 is a flow chart of a method for the manufacture of transition metal oxide fine particles according to the present disclosure.

FIGS. 2 to 9 are schematic views illustrating manufacturing processes for the transition metal oxide fine particles in accordance with the flow chart of FIG. 1.

DETAILED DESCRIPTION

Hereinafter, description will be given in more detail of a method for the manufacture of transition metal oxide fine particles according to the present disclosure, with reference to the accompanying drawings. For the sake of brief description with reference to the drawings, the same or equivalent components will be provided with the same reference numbers, and description thereof will not be repeated. A singular representation may include a plural representation unless it represents a definitely different meaning from the context.

FIG. 1 is a flow chart of a method for the manufacture of transition metal oxide fine particles according to the present disclosure. FIGS. 2 to 9 are schematic views illustrating manufacturing processes of the transition metal oxide fine particles in accordance with the flow chart of FIG. 1.

For manufacturing transition metal oxide fine particles, a strong alkaline (or base) aqueous solution is produced, and then the prepared strong alkaline aqueous solution is heated while stirring (S100).

Figure 3:
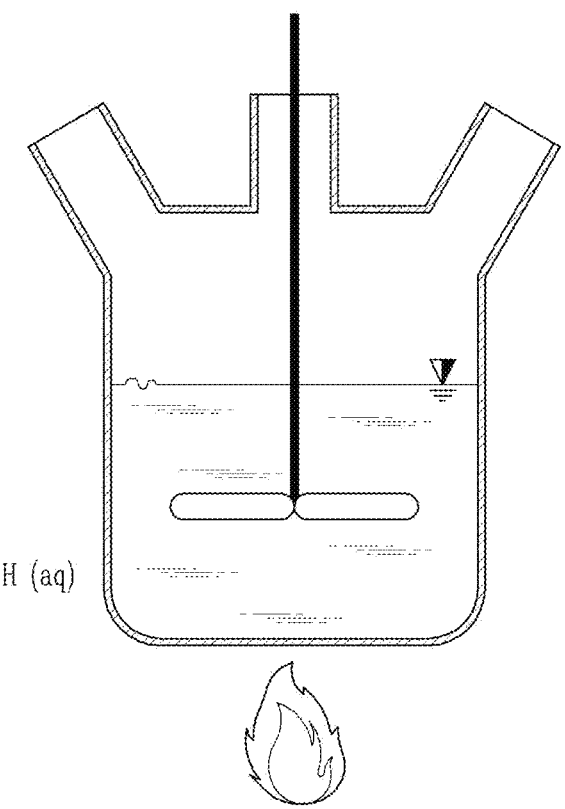

The strong alkaline aqueous solution is made by mixing water (L) and sodium hydroxide (NaOH, s). Then, the prepared strong alkaline aqueous solution is heated while stirring. These processes of producing the strong alkaline aqueous solution are illustrated in FIGS. 2 and 3. The purity of sodium hydroxide should be greater than or equal to 99% to suppress a side reaction caused by a foreign material (or impurity).

A pH of the strong alkaline aqueous solution should be set to an appropriate range for ensuring a proper reaction and sufficient solubility of a transition metal oxide in a subsequent step. The pH of the strong alkaline aqueous solution is determined by the ratio of water to sodium hydroxide, which are mixed in a mass ratio of 6:1 to 10:1. If the ratio is greater than 6:1 (e.g., the mass ratio of water to sodium hydroxide is 3:1), so that the amount of sodium hydroxide is large, the basicity is too strong, causing the reaction rate in the subsequent step to become excessively fast. This may result in acceleration of formation of particle nuclei, and insufficient atomization of the transition metal oxide. In contrast, if the ratio is less than 10:1 (e.g., the mass ratio of water to sodium hydroxide is 15:1), so that the amount of sodium hydroxide is small, the basicity is not strong enough to make the transition metal oxide dissolve.

The strong alkaline aqueous solution is heated at 60° C. to 105° C. while stirring at 600 rpm to 700 rpm.

Stirring (or agitating) may be performed by an agitator rotating at a rotational speed of 600 rpm to 700 rpm, or ultrasonic waves that provide the same effect as when stirring with the agitator. For example, stirring may be performed in a bath sonicator for 5 minutes or longer.

Solubility of the transition metal oxide in the subsequent step is increased and the formation of by-products is suppressed when the strong alkaline aqueous solution is heated within this range. If a temperature of the strong alkaline aqueous solution is lower than 60° C., the effect of increasing the solubility of the transition metal oxide is insufficient, and the size of synthesized particles is not uniform. Also, when the temperature of the strong alkaline aqueous solution is lower than 60° C., the reaction rate may be reduced since sufficient energy required for dissolving the transition metal oxide is not supplied. Conversely, when the temperature of the strong alkaline aqueous solution is higher than 105° C., a chemical reactor may be damaged.

Further, if the temperature of the strong alkaline aqueous solution is out of the range of 60° C. to 105° C., by-products such as $Na_2MoO_4$, $Na_2MoO_4.2H_2O$, $Na_2WO_4$, and $Na_2WO_4.2H_2O$ may be generated when the transition metal oxide is added. Such by-products consume a raw material, which causes a decrease in the production amount of the transition metal oxide fine particles.

Stirring and heating of the strong alkaline aqueous solution may be continued until the sodium hydroxide is completely dissolved in the water, and may also be continuously performed at the subsequent step.

The strong alkaline aqueous solution is used as a solvent for dissolving the transition metal oxide. Transition metal oxides, for example, molybdenum trioxide and/or tungsten trioxide used as a raw material, are not readily soluble in water, but are easily soluble in an alkaline aqueous solution. Unlike a dry environment using a ball mill, control of transition metal oxide particles is available in a wet environment using a strong alkaline aqueous solution.

Referring back to FIG. 1, the transition metal oxide is dissolved in the heated strong alkaline aqueous solution (S200).

Figure 4:
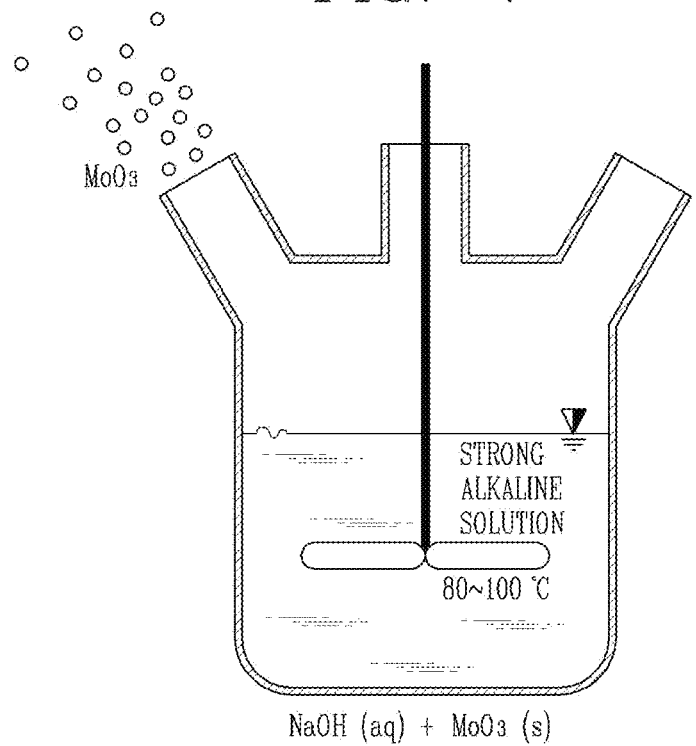

A process of adding transition metal oxide powder to the strong alkaline aqueous solution is illustrated in FIG. 4. The transition metal oxide includes at least one selected from a group composed of molybdenum trioxide and tungsten trioxide. For example, one of either molybdenum trioxide or tungsten trioxide may be used, or molybdenum trioxide and tungsten trioxide may be used together.

In order to ensure the purity of the transition metal oxide fine particles, the purity of molybdenum trioxide may be greater than or equal to 99.5%, and the purity of tungsten trioxide may be greater than or equal to 99%. More preferably, the purity of molybdenum trioxide and tungsten trioxide may be greater than or equal to 99.9%.

When the transition metal oxide is added to the strong alkaline aqueous solution, suspended solids (or floating materials) may be formed. The suspended solids refer to remaining transition metal oxide powders that are not dissolved in the strong alkaline aqueous solution. In order to allow the transition metal oxide to be sufficiently dissolved in the strong alkaline aqueous solution, the transition metal oxide should be sufficiently stirred until suspended solids are fully dissolved in the aqueous solution. Molybdenum trioxide and tungsten trioxide become colorless and transparent when ionized, which may be used to determine whether or not all of the suspended solids are fully dissolved.

Figure 5:
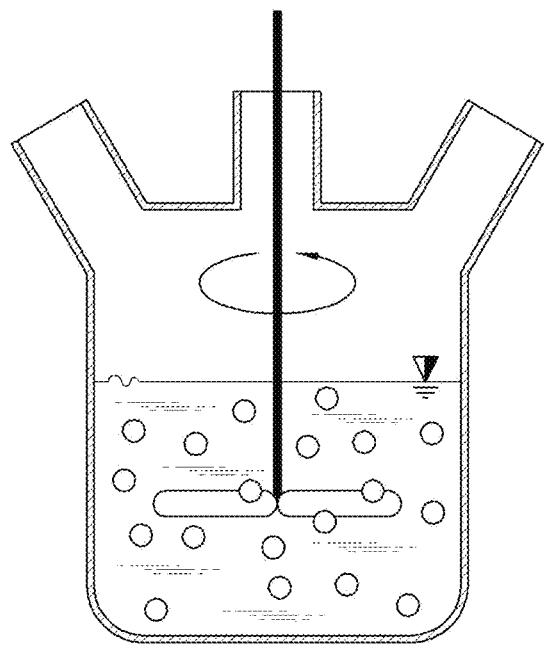

FIG. 5 illustrates a process in which the strong alkaline aqueous solution is heated while stirring to dissolve suspended solids in the strong alkaline aqueous solution. The stirring and heating temperature conditions for heating the strong alkaline aqueous solution while stirring may be maintained in this step of dissolving the transition metal oxide in the strong alkaline aqueous solution.

In order to increase efficiency in producing the transition metal oxide fine particles, the transition metal oxide may be dissolved in the strong alkaline aqueous solution up to saturation. Saturation refers to a state in which a solute is fully dissolved in a solvent and can no longer be dissolved. If the reaction proceeds with a saturated solution, the amount of transition metal oxide fine particles that can be obtained in one reaction is maximized.

When the transition metal oxide contains both molybdenum trioxide and tungsten trioxide, the molybdenum trioxide and the tungsten trioxide may be sequentially dissolved, rather than being simultaneously dissolved, in a strong alkaline aqueous solution. For example, molybdenum trioxide may be fully dissolved in a strong alkaline aqueous solution until saturated, and then tungsten trioxide may be completely dissolved in the strong alkaline aqueous solution up to saturation.

This is because sequential dissolution of the molybdenum trioxide and the tungsten trioxide is more advantageous for nucleation and atomization of transition metal oxide. If molybdenum trioxide and tungsten trioxide are simultaneously dissolved in a strong alkaline aqueous solution, transition metal oxide fine particles greater than a desired size may be produced.

In particular, molybdenum trioxide is more easily dissolved at a high(er) temperature than tungsten trioxide. Therefore, a temperature for dissolving the tungsten trioxide in the strong alkaline aqueous solution may be, preferably, lower than a temperature for dissolving the molybdenum trioxide in the strong alkaline aqueous solution.

Referring back to FIG. 1, a strong acid aqueous solution is added to the strong alkaline aqueous solution and is then stirred to re-dissolve solids or solid materials generated at the interface (S300). This step corresponds to a step of precipitating the transition metal oxide fine particles by titrating the strong alkaline aqueous solution containing the transition metal oxide with the strong acid aqueous solution.

The strong acid aqueous solution may be composed of 60% to 75% nitric acid. Other types of strong acid aqueous solutions may also be used. However, formation of uniform particles is hardly achieved when hydrochloric acid, formic acid, and acetic acid are used.

At the initial stage of adding the strong acid aqueous solution to the strong alkaline aqueous solution, a violent neutralization reaction between strong acid and strong alkaline occurs. At this time, solid materials are rapidly formed at the interface between the strong alkaline aqueous solution and the strong acid aqueous solution.

Figure 6:
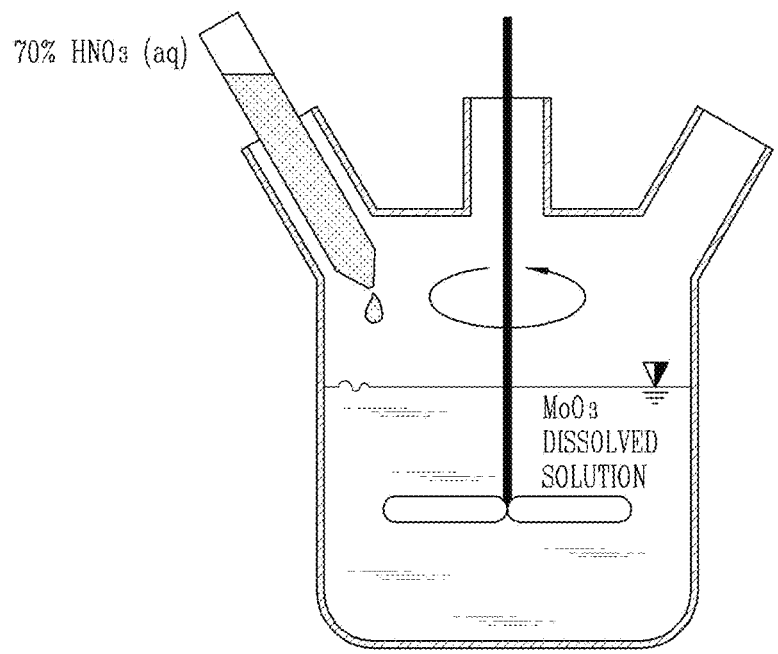

The solid materials rapidly generated at the interface between the strong alkaline aqueous solution and the strong acid aqueous solution are regarded as by-products since their particle size cannot be controlled as intended. Therefore, in order to produce monodisperse transition metal oxide fine particles, a mixed aqueous solution should be stirred to re-dissolve inevitably generated solid materials in a mixed aqueous solution. The mixed aqueous solution refers to a mixture of the strong alkaline aqueous solution and the strong acid aqueous solution. FIG. 6 illustrates a process of re-dissolving solid materials by stirring while adding the strong acid aqueous solution to the strong alkaline aqueous solution.

In order to completely dissolve the solid materials in the mixed aqueous solution, the addition of the strong acid aqueous solution and the dissolution of the solid materials should be performed in stages. If solid materials are generated while adding the strong acid aqueous solution, addition of the strong acid aqueous solution is stopped. Then, the mixed aqueous solution is stirred until the solid materials are fully dissolved in the mixed aqueous solution. When the solid materials are completely re-dissolved, the above process is repeated by adding the strong acid aqueous solution again.

Referring back to FIG. 1, transition metal oxide fine particles are precipitated by controlling speed and amount of adding the strong acid aqueous solution to adjust the pH of the mixture (S400).

In order to suppress the formation of by-products and generate transition metal oxide fine particles of the intended size, a precipitation reaction should occur throughout the mixed aqueous solution, not at the interface between the strong alkaline aqueous solution and the strong acid aqueous solution. To this end, the speed and amount of adding the strong acid aqueous solution to the strong alkaline aqueous solution should be controlled or adjusted.

The addition speed of the strong acid aqueous solution is related to the control of the reaction speed for suppressing the formation of solid materials described in the step S300. When the strong acid aqueous solution is slowly added, the violent reaction between the strong acid and the strong alkaline is reduced. As a result, the formation of solid materials is reduced, and the precipitation reaction occurs in the entire area of the mixed aqueous solution, not the interface between the strong alkaline aqueous solution and the strong acid aqueous solution.

White particles are formed when the strong acid aqueous solution is added to the strong alkaline aqueous solution. When the reaction is continuously going on, the mixed aqueous solution turns to pale green. If the reaction is further continued, the mixed aqueous solution is changed to opaque white and the reaction is terminated. The mixed aqueous solution becomes a suspension.

Figure 7:
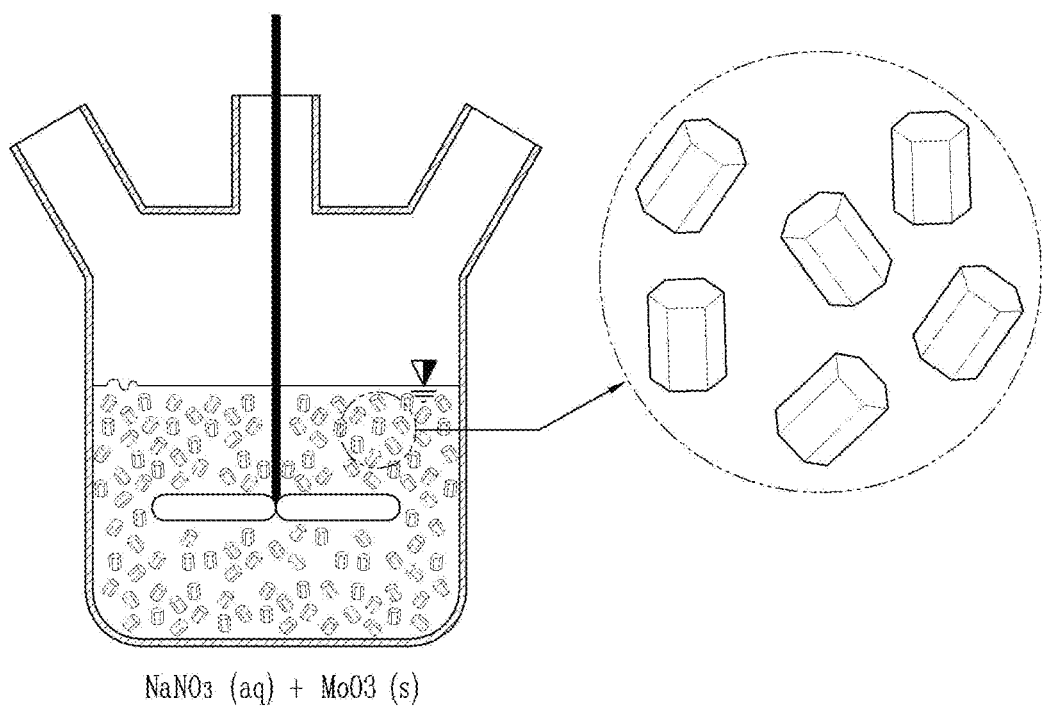

When the strong acid aqueous solution is added to the strong alkaline aqueous solution, the pH of the mixed aqueous solution is gradually adjusted to weakly basic. When the pH of the mixed aqueous solution is reduced to 7.9 to 8.1 by adjusting the amount of adding the strong acid aqueous solution, the solubility changes. Then, the precipitation reaction of the transition metal oxide occurs, and the transition metal oxide fine particles are precipitated. FIG. 7 illustrates the transition metal oxide fine particles precipitated in the mixed aqueous solution.

When the transition metal oxide fine particles are grown through the above processes, transition metal oxide fine particles having a size that cannot be achieved by physical grinding may be obtained. Further, size deviation of the transition metal oxide fine particles is normally distributed.

Referring back to FIG. 1, the transition metal oxide fine particles are separated from the mixed aqueous solution to sequentially perform washing, drying, and heat treating (S500).

The transition metal oxide fine particles are separated from the mixed aqueous solution by filtering the transition metal oxide fine particles out of the mixed aqueous solution using a membrane filter, or through centrifugation. A membrane filter with 200 nm pores may be used for the membrane filter.

Since the separated transition metal oxide fine particles tend to get agglomerated or aggregated with each other due to salt of the mixed aqueous solution, the mixed aqueous solution on the surface of the transition metal oxide fine particle should be quickly removed. In particular, sodium (Na) in the transition metal oxide fine particles should be quickly removed as it generates by-products ($Na_2MoO_4$, $Na_2MoO_4.2H_2O$, $Na_2WO_4$, $Na_2WO_4.2H_2O$).

The synthesized transition metal oxide fine particles may be washed with distilled water or deionized water. When the number of washing times increases, dispersion stability of the transition metal oxide fine particles is enhanced. The dispersion stability refers to the ability of securely maintaining a dispersed state without agglomeration in a solvent constituting a coating solution when transition metal oxide fine particles are added to the solvent to be applied onto a coating layer.

However, as the synthesized transition metal oxide fine particles are in an amorphous state, which are easily soluble in distilled water, a minimum amount of distilled water should be used when washing with the distilled water. For example, if an amount of distilled water exceeds 100 g, yield (or reaction yield) is reduced to 50% or lower, and thus distilled water of 100 g or less is preferably used.

The transition metal oxide fine particles washed with the distilled water are additionally washed with an aqueous solution of ethanol (or aqueous ethanol solution). The synthesized transition metal oxide fine particles are not soluble in ethanol. Therefore, when the transition metal oxide fine particles are additionally washed with the aqueous ethanol solution, a time for drying in the subsequent drying step may be reduced.

Next, the washed transition metal oxide fine particles are dried.

When the transition metal oxide fine particles are several hundred nanometers in size, secondary bonds (hydrogen bonding) between the fine particles occur due to a hydrogen reaction or the Van Des Waals force upon drying, causing aggregation of the fine particles. In this case, it may be difficult to re-disperse (or re-distribute) the fine particles in the solvent constituting the coating solution. In particular, when tungsten trioxide is used as a raw material of the transition metal oxide fine particles, the size of the transition metal oxide fine particles may be adjusted to several hundred nanometers, having a high possibility of agglomeration between fine particles.

Figure 8:
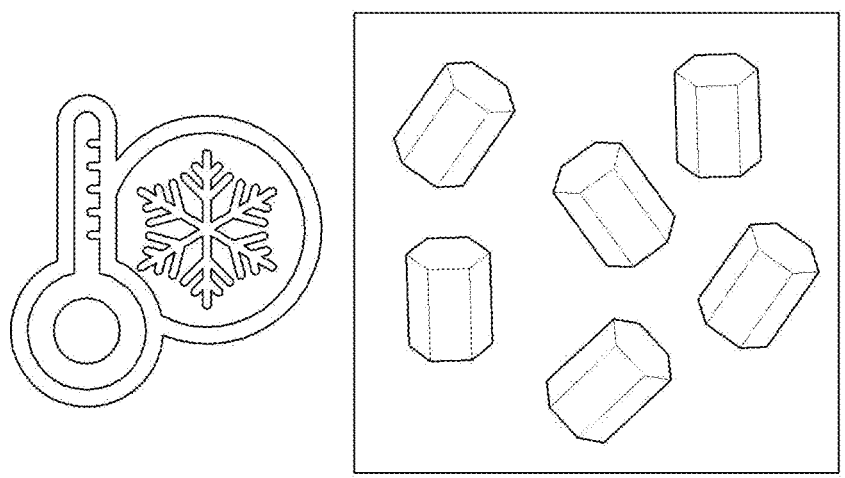

In order to prevent this, a freeze-drying (or lyophilization) method is used. Freeze-drying refers to a process that involves freezing an object and removing ice by sublimation to remove moisture from the object and thereby to obtain a dried product. Dried transition metal oxide fine particles may be obtained by freezing the transition metal oxide fine particles and sublimation of ice. FIG. 8 illustrates a freeze-drying process.

The transition metal oxide fine particles obtained by the freeze-drying method have a porous structure, and pores are left (or exist) at positions where the ice is sublimated. Accordingly, aggregation of the fine particles may be suppressed by these pores.

In addition to the freeze-drying, room temperature drying and vacuum drying configured as primary drying and secondary drying are also available. The washed transition metal oxide fine particles are primarily dried at a room temperature. The primary drying is performed for more than 24 hours. In particular, when the washed transition metal oxide fine particles are instantly or immediately dried at a temperature exceeding the room temperature, agglomeration between the fine particles occurs due to moisture. Therefore, the primary drying at the room temperature should be performed before proceeding with the subsequent secondary drying. When the primary drying is completed, the primarily dried transition metal oxide fine particles are secondarily dried in a vacuum while increasing a temperature above the room temperature. The vacuum drying may be performed in a vacuum oven.

Figure 9:
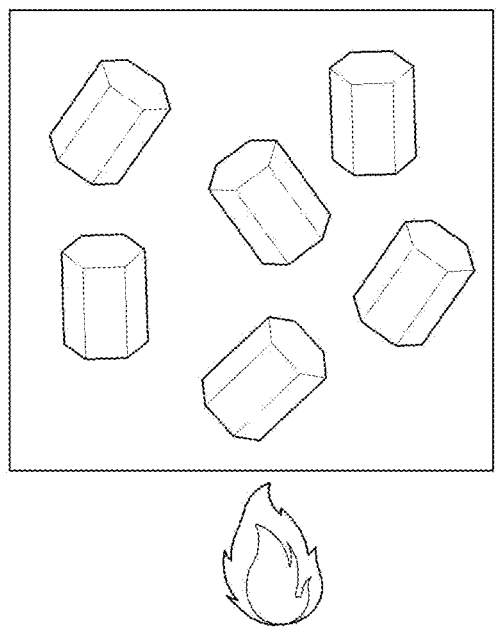

The dried transition metal oxide fine particles are powders that are amorphous and still in a hydrate form or state. Accordingly, the dried transition metal oxide fine particles still have poor dispersion stability in the solvent constituting the coating solution. Therefore, heat treatment (or heat treating) is required to maximize the dispersion stability of the transition metal oxide fine particles. A heat treatment process is illustrated in FIG. 9.

The heat treatment is performed at a temperature of 380° C. to 450° C. for 30 minutes or longer after drying the transition metal oxide fine particles. Heat treatment temperature and time are conditions for changing the phase of the transition metal oxide fine particles to a crystalline state. Crystallization does not sufficiently occur at a heat treatment temperature lower than 380° C. Aggregation between fine particles occurs at a heat treatment temperature higher than 450° C. The transition metal oxide fine particles according to heat treatment temperatures will be described hereinafter with reference to FIGS. 14A to 14D.

When the dried transition metal oxide fine particles are heat treated, they are converted from the hydrate state to a stable phase, so that they are not eluted even in contact with moisture. These transition metal oxide fine particles have dispersion stability in the solvent constituting the coating solution.

When molybdenum trioxide is used as a raw material of the transition metal oxide fine particles, porous microparticles of several micrometers are generated. Here, the level of several microns is a size smaller than approximately 2 μm. When tungsten trioxide is used as a raw material of the transition metal oxide fine particles, or when molybdenum trioxide and tungsten trioxide are used together, transition metal oxide nanoparticles of several hundred nanometers in size, preferably, approximately 700 nm may be generated.

The transition metal oxide fine particles produced through the above processes have a larger surface area per unit mass due to their very small size. Therefore, dispersion stability may be maintained when these transition metal oxide fine particles are added to a coating solution for forming a coating layer on a base material such as a polymer, and material properties of the base material may also be maintained.

When a raw material of the transition metal oxide contains both molybdenum trioxide and tungsten trioxide, an Mo—W—O molecular formula may be derived through XRF (X-ray fluorescence analyzer, X-ray fluorescence) analysis as shown in Table 1.

TABLE 1

|  | W | Mo | Na | O |
|---|---|---|---|---|
| wt. % | 45.45 | 27.98 | 0.56 | 26.04 |
| at. % | 11.28 | 13.31 | 1.11 | 74.30 |

When the molecular formula of the transition metal oxide fine particles is $Mo_x$—$W_y$—$O_z$, x, y, and z are calculated as follows.

$$x=13.31/((11.28+13.31)/2)=1.08(1.0825\ldots)$$

$$y=11.28/((11.28+13.31)/2)=0.92(0.9174\ldots)$$

$$z=(74.30-1.11*3)/((11.28+13.31)/2)=5.78(5.7722\ldots)$$

Therefore, a molecular formula of the synthesized transition metal oxide fine particles is $Mo_{1.08}W_{0.92}O_{5.72}=Mo_1W_{0.85}O_{5.30}$.

EXAMPLE 1

Refer to the embodiments of manufacturing the transition metal oxide fine particles illustrated in FIGS. 2 to 9.

Molybdenum trioxide with the high purity of 99.95%, sodium hydroxide with the purity of 99% or higher, and nitric acid 70% (70% concentrated nitric acid solution) were used for producing transition metal oxide fine particles.

Sodium hydroxide was mixed at a mass ratio of 3:1 to produce a strong alkaline aqueous solution, and then stirred in a bath sonicator for 5 minutes or longer (FIG. 2). Subsequently, the mixed aqueous strong alkaline solution was heated at a temperature ranging from 80° C. to 100° C. (FIG. 3).

Next, molybdenum trioxide powder was added to the strong alkaline aqueous solution up to saturation (FIG. 4). Then, the mixture was sufficiently stirred until suspended solids of the molybdenum trioxide were dissolved in the strong alkaline aqueous solution (FIG. 5).

Next, nitric acid 70% was slowly added to the strong alkaline aqueous solution, and solids or solid materials generated at the interface between the strong alkaline aqueous solution and the nitric acid 70% were re-dissolved in the mixed aqueous solution by stirring (FIG. 6).

As the nitric acid 70% was added to the strong alkaline aqueous solution, the pH of the mixed aqueous solution ($NaOH_3$) was reduced, and when the pH of the mixed aqueous solution reached around 8, nucleation was generated throughout the mixed aqueous solution, and molybdenum trioxide fine particles were precipitated in the mixed aqueous solution (FIG. 7).

The molybdenum trioxide fine particles were separated from the mixed aqueous solution, washed with deionized water, then freeze-dried (FIG. 8), followed by heat treatment at 400° C. for 1 hour (FIG. 9).

As a result, fine particles of 2 μm or less that can maintain dispersion stability even in the presence of moisture were generated.

Here, the pH of the aqueous solution was measured using a highly sensitive pH meter electrode (Horiba F-72, 9618S-10D electrode) for pH measurement of deionized water.

Next, effects of the present disclosure will be verified by comparing the size of the transition metal oxide fine particles before and after heat treating.

Figure 10:
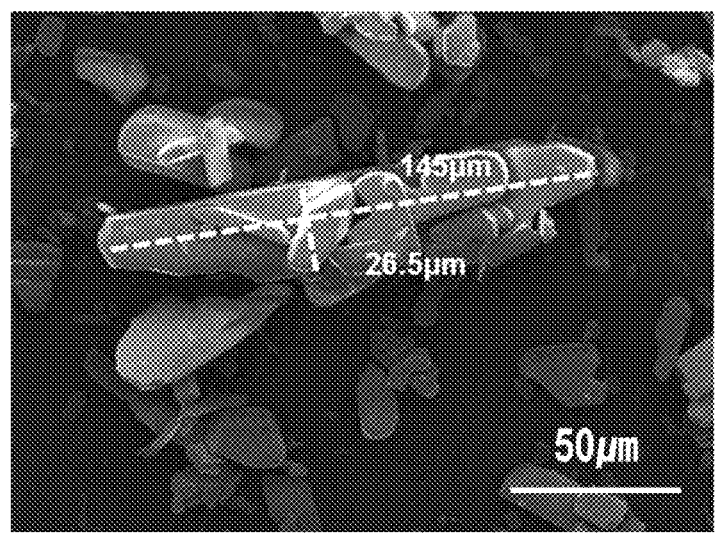
FIG. 10 is an electron micrograph of molybdenum trioxide powder, which is a raw material of transition metal oxide fine particles.
Figure 11:
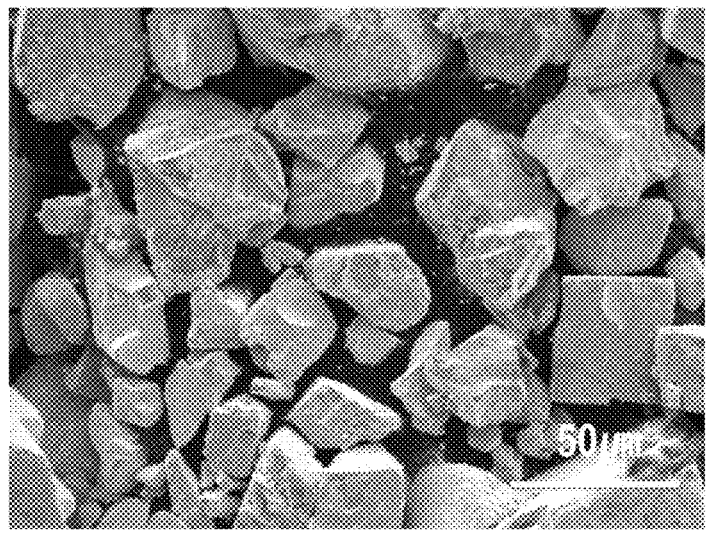
FIG. 11 is an electron micrograph of tungsten trioxide powder, which is a raw material of transition metal oxide fine particles.

FIG. 10 is an electron micrograph of molybdenum trioxide powder, which is a raw material of transition metal oxide fine particles. FIG. 11 is an electron micrograph of tungsten trioxide powder, which is a raw material of transition metal oxide fine particles.

Molybdenum trioxide powder and tungsten trioxide powder, which are raw materials, range from tens to hundreds of micrometers in size.

Figure 12:
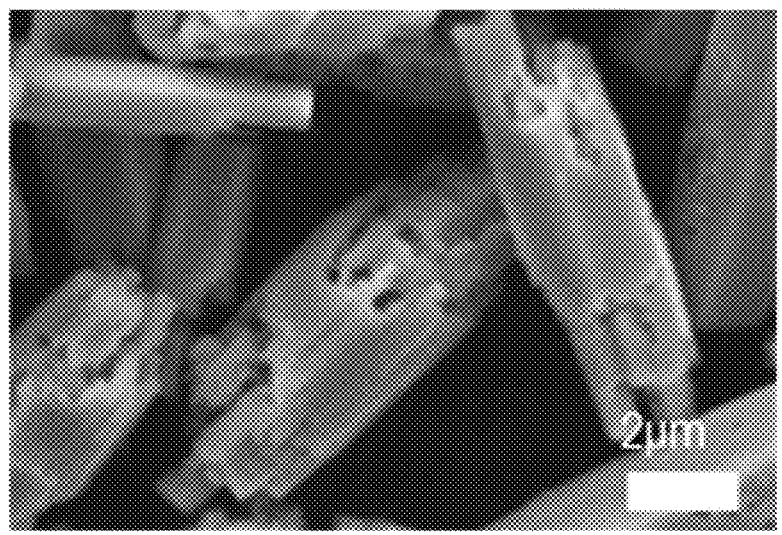
FIG. 12 is an electron micrograph of molybdenum trioxide fine particles before heat treatment.
Figure 13:
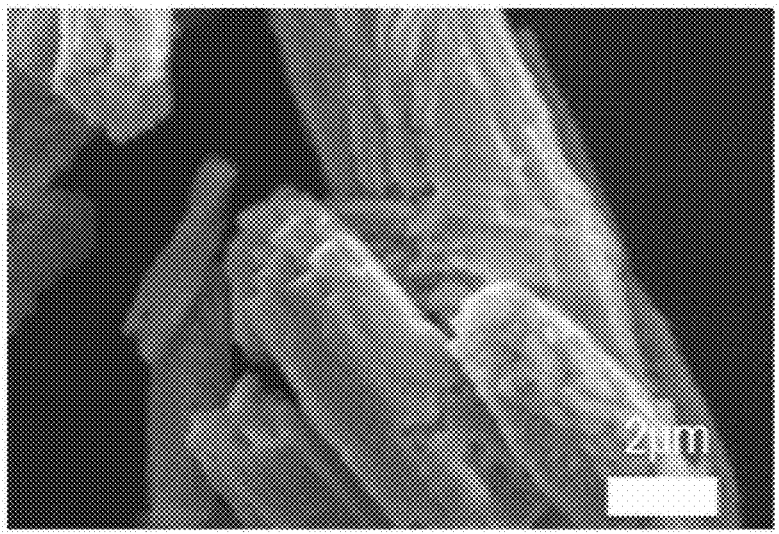
FIG. 13 is an electron micrograph of molybdenum trioxide fine particles after heat treatment.
Figure 14A:
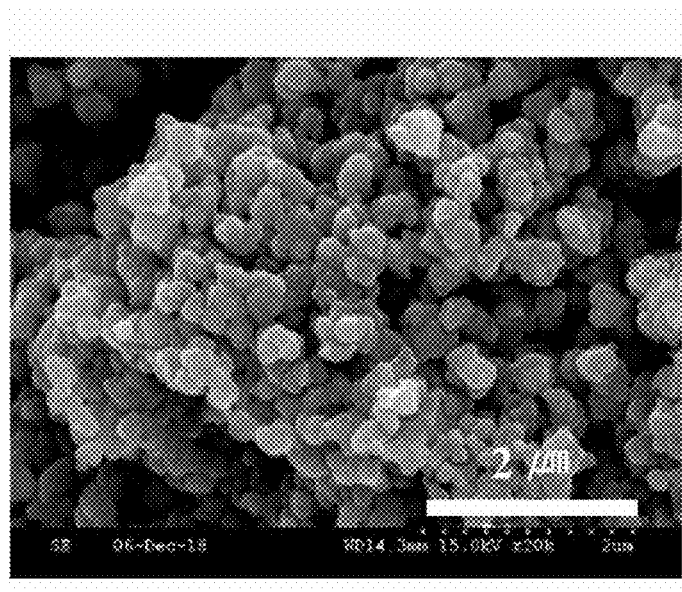
FIGS. 14A to 14D are electron micrographs of molybdenum/tungsten (Mo/W)—mixed oxide crystal powder according to heat treatment temperatures.
Figure 14B:
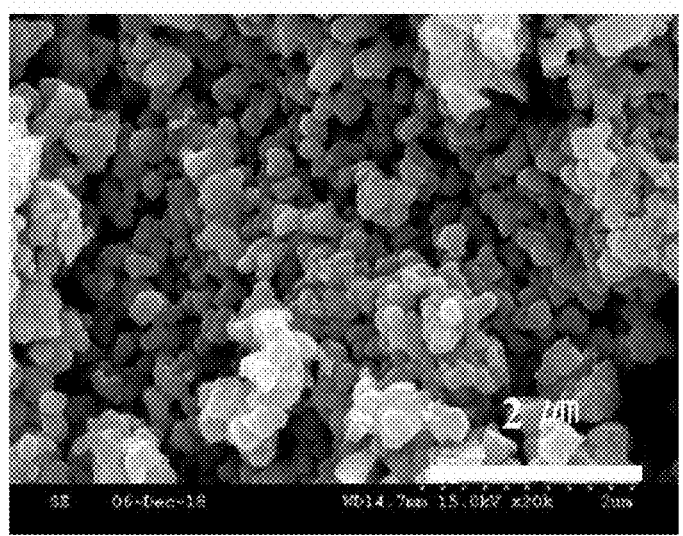
Figure 14C:
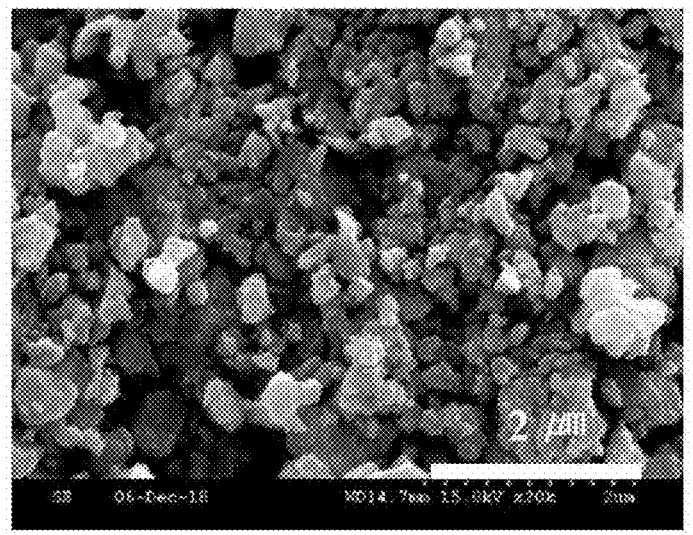
Figure 14D:
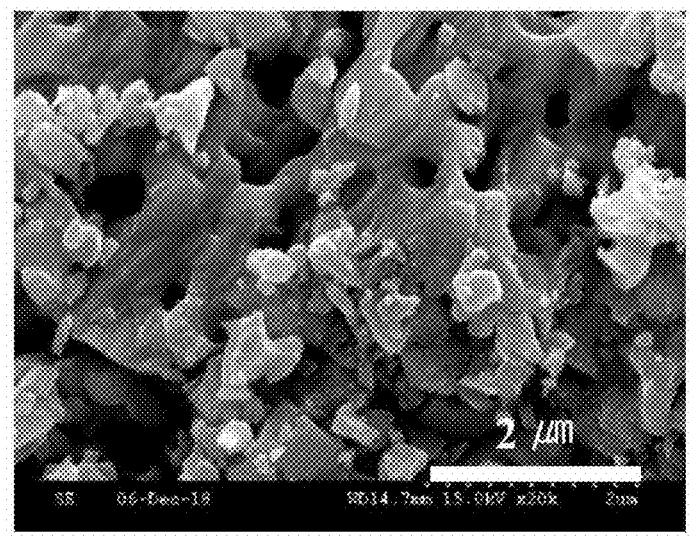

FIG. 12 is an electron micrograph of molybdenum trioxide fine particles before heat treatment. FIG. 13 is an electron micrograph of molybdenum trioxide fine particles after heat treatment.

Molybdenum trioxide fine particles produced through these steps have a hexagonal phase in the form of hydrate prior to heat treatment, but the molybdenum trioxide fine particles have an alpha phase after heat treatment at 400° C. for 1 hour. The alpha phase is a stable phase in which elution does not occur even in contact with moisture.

Molybdenum trioxide fine particles produced according to the present disclosure have a porous structure of 2 μm or less. Even if the molybdenum trioxide fine particles are not freeze-dried, they do not aggregate with each other after drying, and the molybdenum trioxide fine particles become stable after heat treatment so as to be used as an additive of a coating solution.

FIGS. 14A to 14D are electron micrographs of molybdenum/tungsten (Mo/W)—mixed oxide crystal powder according to different heat treatment temperatures.

Crystallization did not sufficiently occur at a heat treatment temperature of 350° C. Aggregation between fine particles occurred at a heat treatment temperature of 500° C. At a heat treatment temperature of 400° C. and a heat treatment temperature of 450° C., the phase of the fine particles was changed to a crystalline state.

Figure 15:
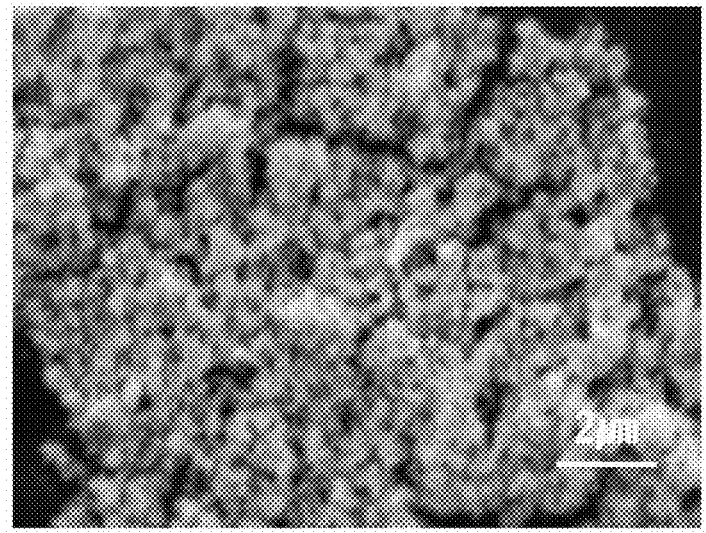
FIGS. 15 and 16 are electron micrographs of Mo/W-mixed oxide crystal powder produced according to the present disclosure.
Figure 16:
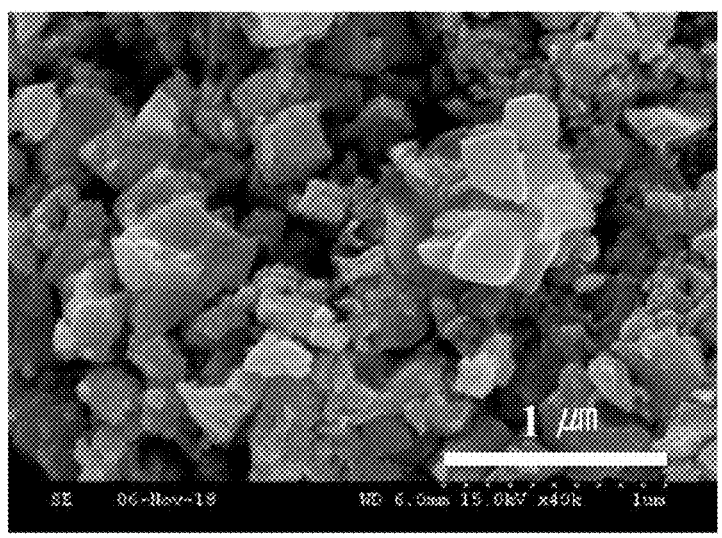
Figure 17:
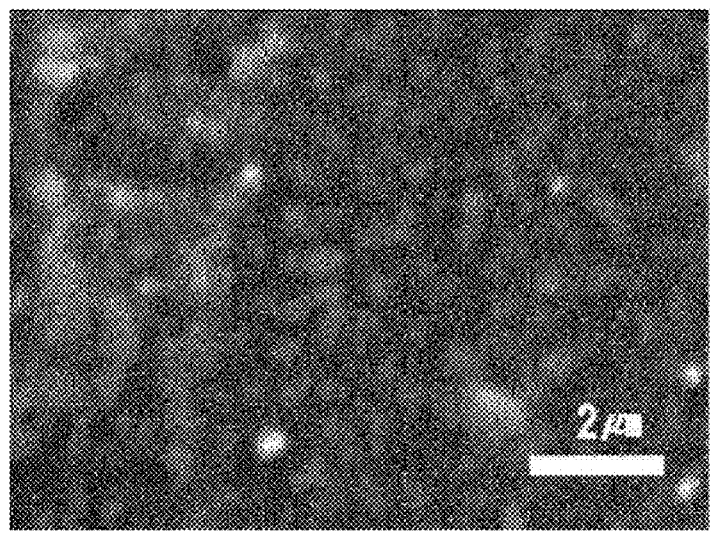
FIG. 17 is an electron micrograph of a coated surface to which the Mo/W-mixed oxide crystal powder of FIG. 15 is added.

FIGS. 15 and 16 are electron micrographs of Mo/W-mixed oxide crystal powder produced according to the present disclosure. FIG. 17 is an electron micrograph of a coated surface to which the Mo/W-mixed oxide crystal powder of FIG. 15 is added.

The Mo/W-mixed oxide crystal powder have a size smaller than the fine particles shown in the micrograph of FIG. 13. Since there is a possibility of aggregation, freeze-drying may be, preferably, used to prevent this.

In a solvent constituting a coating solution, dispersion stability of an additive is required. In particular, in the case of a thin film coating layer, transition metal oxide fine particles are required to have a smaller size to become a stable composition of the thin film coating layer. As it can be seen from the electron micrographs of FIGS. 15 and 16, the mixed transition metal oxide fine particles have a size of several hundred nanometers, which makes them to be a stable composition of the thin film coating layer. This may be confirmed in the electron micrograph of FIG. 17.

As for the electron micrographs of the present disclosure, morphology analysis was conducted on a surface of a test piece using a scanning electron microscopy (SEM). In addition, elemental analysis was conducted using an energy dispersive x-ray spectroscope (EDX), and a particle size was analyzed using a particle size analyzer (PSA, S3500, Microtrac). Crystallization of the synthesized transition metal oxide fine particles was performed in a calcining furnace, and the crystallized particles were analyzed using XRD (X-ray diffraction, D8 Advance, Bruker).

The method for the manufacture of transition metal oxide fine particles described above is not limited to the configurations and the methods of the embodiments described above, but the embodiments may be configured by selectively combining all or part of the embodiments so that various modifications or changes can be made.

INDUSTRIAL AVAILABILITY

The present disclosure may be used in industrial fields that use transition metal oxide fine particles.

What is claimed is:

1. A method for manufacture of transition metal oxide fine particles, the method comprising:
    heating a strong alkaline aqueous solution while stirring;
    adding a transition metal oxide to the heated strong alkaline aqueous solution to dissolve the transition metal oxide in the strong alkaline aqueous solution;
    adding a strong acid aqueous solution to the strong alkaline aqueous solution in which the transition metal oxide is dissolved while stirring to re-dissolve a solid material formed at an interface between the strong alkaline aqueous solution and the strong acid aqueous solution;
    adjusting the pH of a mixed aqueous solution of the strong alkaline aqueous solution and the strong acid aqueous solution by controlling speed and amount of adding the strong acid aqueous solution to precipitate transition metal oxide fine particles; and separating the transition metal oxide fine particles from the mixed aqueous solution and sequentially washing, drying, and heating the separated transition metal oxide fine particles, wherein the transition metal oxide includes molybdenum trioxide and tungsten trioxide, wherein the dissolving of the transition metal oxide in the strong alkaline aqueous solution is performed to sequentially dissolve molybdenum trioxide and tungsten trioxide in the strong alkaline aqueous solution.

2. The method of claim 1, wherein water and sodium hydroxide (NaOH) are mixed in a mass ratio of 6:1 to 10:1, then heated while stirring to produce the strong alkaline aqueous solution.

3. The method of claim 2, wherein the purity of the sodium hydroxide is greater than or equal to 99%.

4. The method of claim 1, wherein the heating of the strong alkaline aqueous solution while stirring is performed to heat the strong alkaline aqueous solution at 60 to 105° C. while stirring at 600 rpm to 700 rpm.

5. The method of claim 1, wherein a temperature for dissolving the tungsten trioxide in the strong alkaline aqueous solution is lower than a temperature for dissolving the molybdenum trioxide in the strong alkaline aqueous solution.

6. The method of claim 1, wherein the purity of the molybdenum trioxide is greater than or equal to 99.5%, and the purity of the tungsten trioxide is greater than or equal to 99%.

7. The method of claim 1, wherein the dissolving of the transition metal oxide in the strong alkaline aqueous solution is performed until the transition metal oxide is saturated.

8. The method of claim 1, wherein the dissolving of the transition metal oxide in the strong alkaline aqueous solution is performed to heat the transition metal oxide while stirring until all of suspended solids are dissolved in the strong alkaline aqueous solution.

9. The method of claim 1, wherein the dissolving of the transition metal oxide in the strong alkaline aqueous solution is performed to heat the strong alkaline aqueous solution while stirring until the strong alkaline aqueous solution becomes transparent.

10. The method of claim 1, wherein the dissolving of the transition metal oxide in the strong alkaline aqueous solution is performed under the same stirring and heating temperature conditions as the heating of the strong alkaline aqueous solution while stirring.

11. The method of claim 1, wherein the strong acid aqueous solution is composed of 60% to 75% nitric acid.

12. The method of claim 1, wherein the re-dissolving of the solid material comprises:
adding the strong acid aqueous solution;
stopping the addition of the strong acid aqueous solution when the solid material is formed;
stirring until the solid material is re-dissolved in the mixed aqueous solution of the strong alkaline aqueous solution and the strong acid aqueous solution; and
adding the strong acid aqueous solution again when the solid material is re-dissolved in the mixed aqueous solution.

13. The method of claim 1, wherein the precipitating of the transition metal oxide fine particles is performed to generate the transition metal oxide fine particles by adjusting the pH of the mixed aqueous solution to weakly basic.

14. The method of claim 1, wherein the precipitating of the transition metal oxide fine particles is performed to generate the transition metal oxide fine particles by reducing the pH of the mixed aqueous solution to 7.9 to 8.1.

15. The method of claim 1, wherein the separating of the transition metal oxide fine particles from the mixed aqueous solution is performed to filter the transition metal oxide fine particles using a membrane filter, and the washing of the separated transition metal oxide fine particles is performed with distilled water of 100 g or less.

16. The method of claim 15, wherein the washing of the separated transition metal oxide fine particles is performed such that the transition metal oxide fine particles washed with the distilled water are additionally washed with an aqueous solution of ethanol.

17. The method of claim 1, wherein the drying of the transition metal oxide fine particles is performed to freeze dry the transition metal oxide fine particles.

18. The method of claim 1, wherein the drying of the transition metal oxide fine particles comprises:
primary drying the transition metal oxide fine particles at room temperature for at least 24 hours; and
second drying the primarily dried transition metal oxide fine particles in a vacuum while increasing a temperature above room temperature.

19. The method of claim 1, wherein the heating of the transition metal oxide fine particles is performed such that the transition metal oxide fine particles separated from the mixed aqueous solution are dried and heated at a temperature of 380° C. to 450° C. for at least 30 minutes.

* * * * *